United States Patent [19]

Buros

[11] 4,249,072

[45] Feb. 3, 1981

[54] METHOD OF CORRECTING ERRONEOUSLY ENCODED OPTICAL CHARACTER RECOGNITION ENCODING

[75] Inventor: William B. Buros, Scottsdale, Ariz.

[73] Assignee: Micr-Shield Co., Phoenix, Ariz.

[21] Appl. No.: 48,240

[22] Filed: Jun. 13, 1979

[51] Int. Cl.³ .................. G06K 19/06; G06K 7/10
[52] U.S. Cl. .................................. 235/491; 235/468; 250/271
[58] Field of Search ............... 235/491, 468; 250/271, 250/484, 486, 487, 483; 340/146.3 Z

[56] References Cited

U.S. PATENT DOCUMENTS

| 3,676,646 | 7/1972 | Carlsen et al. | 235/491 |
| 3,786,237 | 1/1974 | Postal | 235/491 |

*Primary Examiner*—Daryl W. Cook
*Attorney, Agent, or Firm*—Cahill, Sutton & Thomas

[57] ABSTRACT

A method for correcting erroneously encoded optical character recognition indicia through the application of a solution containing ferric chloride to the erroneously encoded indicia to effectively quench the florescense of the indicia when excited by ultraviolet light. The solution is permitted to dry and new ultraviolet excitable ink is utilized to re-encode the document over the quenched erroneously encoded indicia.

6 Claims, 4 Drawing Figures

METHOD OF CORRECTING ERRONEOUSLY ENCODED OPTICAL CHARACTER RECOGNITION ENCODING

The present invention pertains to a method of effectively correcting erroneously encoded documents encoded with ultraviolet light excitable ink arranged thereon in coded format.

The utilization of encoded documents having machine readable indicia thereon have become an integral part of all large volume paper handling industries such as banks, credit card establishments, large commercial organizations and the like. To permit the efficient handling of such documents, the encoded indicia is placed on a specific location on the document to permit the document to be machine read. The different types of encoding systems have all been designed to maximize the efficiency with which the information contained in the encoded indicia can be read and transmitted to data processing equipment. Some encoding systems, such as that used in magnetic ink character recognition, utilize specialized magnetizable inks that can readily be detected and read by machine reading equipment for the conversion of the information into appropriate format for use in a processing system. Similarly, optical character recognition systems provide indicia in the format of marks or symbols placed on the document that act as light reflectors so that as the documents pass through reading equipment, and as light is directed upon the document, the reflected light from the indicia activates suitable photoelectric equipment to produce the necessary electrical signals for the data processing system.

A significant difficulty with optical character recognition systems is that fact that background markings or indicia on the document may interfere with the encoding and may confuse the machine reading equipment if the equipment can not distinguish between the light being reflected from the encoding and the light being reflected from other markings or indicia on the document. To overcome the latter difficulty, it has been found expedient to differentiate between the light reflecting properties of ordinary indicia on a document from light that would be reflected as a result of the impingement of light in a specific frequency band to which the encoded indicia is uniquely sensitive and to thereby be capable of ignoring ordinary printing or similar markings on the document. Thus, optical character recognition systems frequently utilize particular inks which, while visible to the human eye, will floresce when appropriately energized by light energy of a frequency within the excitation band of the florescent ink. Thus, such encoding indicia are typically formed from florescent inks which become excited by ultraviolet light to cause the materials of the inks to floresce and reflect a detectable light for machine reading.

Occasionally such encoding incorporates a mistake and the information encoded on the document is erroneous. To correct the miscoding, there have generally existed three types of correction systems. The first system is to take the document that is erroneously encoded and insert it into an envelope, encode the exterior of the envelope and process the envelope with the encoded document therewithin. This process is generally time consuming and expensive and can frequently cause jamming of high speed reading equipment which must handle the additional thickness of the envelope (sometimes referred to as "document carriers").

Another system used for correcting such errors is the utilization of an adhesive label which is simply placed on top of the erroneously encoded indicia; the proper encoding is then placed on top of the label for further handling. The correction label method, as well as the document carrier method for correcting erroneous encoding present additional drawbacks in that the ultraviolet light that is directed upon the document is usually prismatically focused to a very high intensity; such high intensity is frequently sufficient to penetrate the document carrier or the label to cause the underlying erroneous encoding to floresce and thereby present confusing and sometimes erroneous signals to the reading equipment.

The third system for correcting erroneously encoded optical character recognition documents is the utilization of a technique known as "extended clear band". In this latter technique, a strip of paper, or other suitable material, is attached along the bottom edge of the document to thereby elevate the document as it travels along the channel of an automatic reading system and to cause the erroneously encoded indicia to miss the read heads of the equipment. The re-encoding is then placed either on the extended clear band or on another line of the document and the document fed through the equipment. Using the extended clear band technique is also time consuming and expensive and also requires that all of the information in a line of indicia be re-encoded (whether correctly or incorrectly encoded) since the correctly encoded information on a line containing erroneously encoded information is displaced from the read head along with the incorrect encoding and is therefore not read by the machine.

The use of labels can also be undesirable in view of the fact that such labels can frequently cover other information on the document that may be of importance, e.g., an endorsement. The carrier envelope can also be undesirable in that there is no record on the original document that an error had been committed and that the information fed into the automatic reading machinery is different than the information contained on the document.

It is therefore an object of the present invention to provide a method for correcting erroneously encoded optical character recognition documents without the use of a carrier envelope, label or an extended clear band.

It is another object of the present invention to provide a method for correcting erroneously encoded optical character recognition documents wherein only the erroneously encoded portion of the information encoded in the document need be re-encoded.

It is still another object of the present invention to provide a method for correcting erroneously encoded optical character recognition documents wherein useful underlying indicia is not altered or destroyed by the re-encoding of correct information.

It is still another object of the present invention to provide a method for correcting erroneously encoded optical character recognition documents wherein an indication is provided on the document when an alteration or change has been made and information has been re-encoded in lieu of previously existing information.

These and other objects of the present invention will become apparent to those skilled in the art as the description thereof proceeds.

Briefly, and in accordance with the method of the present invention, an erroneously encoded optical character recognition document having florescent ink indicia thereon is treated through the application of a ferric chloride solution to the erroneously encoded indicia. The solution effectively quenches the florescing capabilities of the indicia when subjected to an ultraviolet light. The solution is permitted to dry and the document is re-encoded with florescent inks in the form of correctly coded indicia on top of the dried solution.

The present invention may more readily be described by reference to the accompanying drawings in which.

Figure 1:
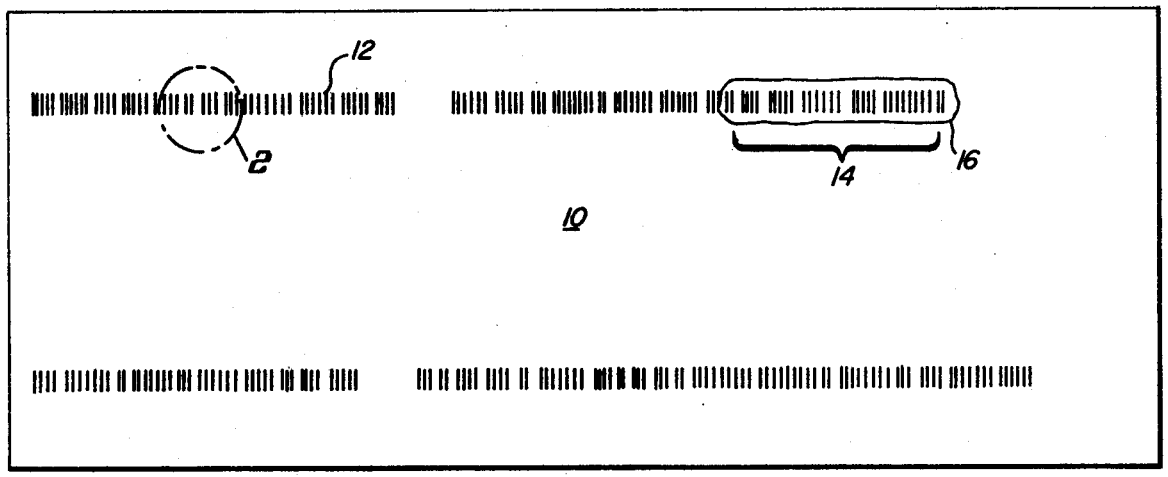
FIG. 1 is an illustration of an optical character recognition encoded document showing indicia in the form of bar coding formed from ultraviolet light excitable inks, and showing an erroneous encoding having been treated with a ferric chloride solution.
Figure 2:
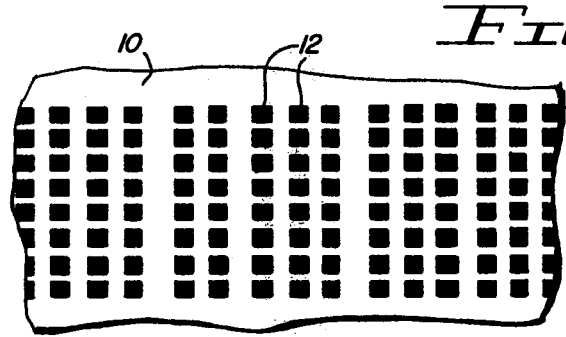
FIG. 2 is an enlargement of the encoding bars used to encode the document of FIG. 1.

Referring now to FIG. 1, a document 10 is shown having typical optical character recognition indicia thereon. The indicia 12 comprises a bar code formed of a plurality of bars or lines having variable spacing therebetween to represent alphanumeric information in encoded form. The bars or lines 12 are usually formed of a plurality of small vertical dots that are placed upon the document by spraying the ink forming the bars onto the document. The ink chosen for the encoding indicia are ultraviolet light excitable and will floresce when ultraviolet light impinges thereon. The particular code format, the type of indicia, or the specific inks involved are not of major significance to the present invention. However, the florescing characteristic of the ink permits the method of the present invention to be utilized to correct erroneously encoded indicia.

The bar coding on the document is visible to the human eye, and will generally not obscure or interfere with underlying indicia on the document such as non-encoded printed matter, endorsements, or other marks. When the document is to be read, it is passed through a reading machine having a prismatically focused ultraviolet light directed upon the indicia, causing the latter to floresce. The machine detects the light radiated from the florescing indicia and produces appropriate electrical signals for utilization in a data processing system. The techniques used for applying the florescing ink, as well as the system utilized for reading the encoding indicia, are well known in the art and need not be described herein.

Figure 3:
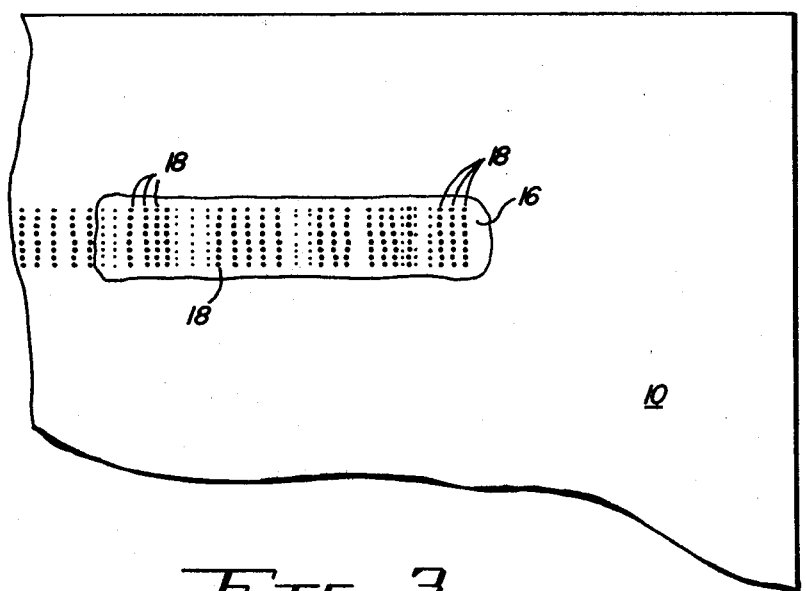
FIG. 3 is an illustration of a portion of the document of FIG. 1 showing the re-encoded bar code placed on the dried solution.

Occasionally, information is erroneously encoded on the document such as indicated in FIG. 1 by the portion of the bar code indicated by the reference numeral 14. To correct the erroneous encoding, a ferric chloride solution is applied to the document 10 over the erroneously encoded indicia, as indicated by the area 16. When the solution has dried, the document may then be re-encoded by applying new indicia, as indicated at 18 in FIG. 3, over the dried solution. The document may then be processed through a machine reading system in the conventional manner. The dried solution on the area 16 of the document 10 leaves a noticeable discoloration in the area of the correction so that the fact that a correction has been made to the encoded indicia is readily apparent; this latter feature is important in those instances where it may be necessary to provide an audit trail and to prevent defalcation.

Figure 4:
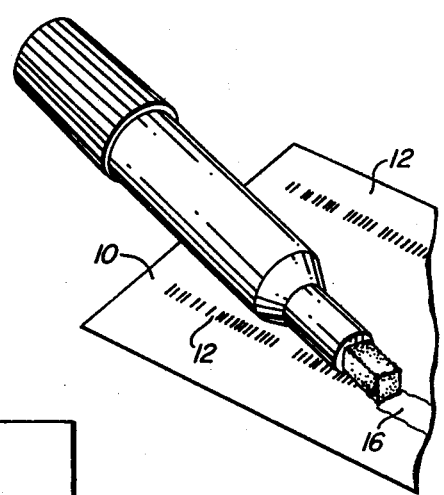
FIG. 4 is a view of a suitable device for applying the ferric chloride solution to the erroneously encoded indicia of the document of FIG. 1.

The specific device utilized to apply the solution to the document is not critical; however, it has been found that a felt tipped pen, such as that shown in FIG. 4, represents an excellent means for applying the solution directly to the erroneous encoding. The felt tip of the pen, saturated with the ferric chloride solution, is placed on the indicia and is passed over the indicia, preferably by several strokes. It is not necessary or desirable to attempt to remove the erroneous encoding. The ferric chloride solution from the tip is simply urged into intimate contact with the dried ink of the indicia so as to interact with the florescing capability of the ink. The exact mechanism of the interaction is not known; however, it has been found that while the erroneously encoded indicia remain visible to the human eye, the ability of the indicia to floresce under the influence of an ultraviolet light has been eliminated. Such quenching action effectively "erases" the indicia insofar as the machine reading equipment is concerned, and indicia re-encoded over the dried solution may thereafter floresce in the normal manner without interference from the previous encoding.

The ferric chloride solution is an unsaturated solution formed by dissolving crystalline anhydrous ferric chloride in a solvent combined with an acid, miscible with the solvent, to maintain the ferric chloride in solution. The specific solvent utilized is not critical, although in view of the use of the solution, it is important to prevent malodor and insure non-toxicity. It is particularly important to avoid utilization of chlorinated hydrocarbons in such solvents. It has been found that ethylene glycol base solvents are eminently suited for the present application. The solvent should also provide a stable and effective life to the solution while nevertheless being reasonably quickly drying to permit the re-encoding of the document without an inordiante delay. Accordingly, it has been found that a ferric chloride solution dissolved in an ethylene glycol base in the following proportions provides optimum performance in the present method:

3% ferric chloride by weight of total solution
ascetic acid in a ratio of 5 parts by weight ascetic acid to 6 parts ferric chloride ($2\frac{1}{2}$% by weight of total solution)
remainder of the solution ethylene glycol base solvent in the following proportions:
  75% of remainder ethylene glycol mono ethyl ether (70.875% by weight of total solution)
  25% of remainder ethylene glycol butyl ether (23.625% by weight of total solution)

For example, a document having ultraviolet light excitable ink thereon arranged in the form of a bar code was processed through a machine reader to read the information represented by the coded format of the bar code. A portion of the information was erroneously encoded; the erroneously encoded portion of the bar code was treated with the above solution by applying the solution with a felt tipped pen, saturated in the solution, to the erroenously encoded bar code indicia. The solution on the document was permitted to dry at room temperature. The document was subsequently re-encoded with ultraviolet light excitable ink over the dried solution. The document was discolored in that area covered by the dried solution and the original erroneously encoded indicia remained visible to the human eye. The document was then machine read and the properly encoded information was detected and read in a normal manner by the machine.

The ratios of the ethylene glycol solvents may be determined empirically for the particular application in mind; that is, the ethylene glycol butyl ether provides suitable low evaporation and shelf stability while the ethylene glycol mono ethyl ether provides quick drying time. Thus, the ratios of these two solvents can be modified to accommodate a range of desired drying times and shelf life.

Limited variation, within a predetermined range, in the percentage of ferric chloride in the solution may be tolerated without adversely affecting the performance of the solution. For example, it has been found that less than one percent ferric chloride by weight will not adequately quench the florescence of the ultraviolet light activated indicia; similarly, it has been found that a solution containing more than ten percent ferric chloride by weight would quench the erroneously encoded indicia but would also adversely affect the florescence of the re-encoded indicia. The percentage of ferric chloride in solution therefore appears to be critical for solutions to be used in the method of the present invention. The range of ferric chloride of from one percent by weight of ten percent by weight, and preferably three percent by weight, provide florescing quenching properties while permitting re-encoding over the dried solution. As stated previously, the specific solvent is not critical, although ethylene glycol base solvents appear optimum.

I claim:

1. In an optical character recognition system using encoding indicia formed from ultraviolet light excitable ink arranged in an encoded format on a document to be machine read, a method for correcting an erroneously encoded document having erroneously encoded indicia thereon, comprising the steps:
   a. applying a ferric chloride solution, having from 1% by weight to 10% by weight of ferric chloride, to the erroneously encoded indicia of said document;
   b. drying said solution on said document; and
   c. re-encoding said document over said erroneously encoded indicia by applying new encoding indicia, formed from ultraviolet excitable ink, on an area of said document containing dried solution.

2. The method of claim 1 wherein said ferric chloride solution includes ascetic acid in a ratio of 5 parts by weight of ascetic acid to 6 parts by weight of ferric chloride.

3. The method of claim 1 wherein said solution is a ferric chloride solution formed from dissolving anhydrous crystalline ferric chloride in an ethylene glycol base solvent.

4. The method of claim 1 wherein said solution comprises: from 1% to 10% by weight of ferric chloride, ascetic acid in a ratio by weight of 5 parts ascetic acid to 6 parts ferric chloride, the remainder of the solution consisting of ethylene base solvent.

5. The method of claim 4 wherein said ethylene base solvent comprises 75% by weight ethylene glycol mono ethyl ether and 25% by weight ethylene glycol butyl ether.

6. The method of claim 1 wherein said solution consists of 3% of weight ferric chloride, 5 parts by weight ascetic acid to 6 parts by weight ferric chloride, the remainder consisting of 75% ethylene glycol mono ethyl ether and 25% ethylene glycol butyl ether.

* * * * *